US011356849B2

(12) United States Patent
Salgado et al.

(10) Patent No.: US 11,356,849 B2
(45) Date of Patent: Jun. 7, 2022

(54) METHOD OF SECURELY AUTHENTICATING A TRANSPONDER IN COMMUNICATION WITH A SERVER

(71) Applicant: EM Microelectronic-Marin SA, Marin (CH)

(72) Inventors: Stéphanie Salgado, La Neuveville (CH); Julian Guilloux, Colombier (CH)

(73) Assignee: EM MICROELECTRONIC-MARIN S.A., Marin (CH)

( * ) Notice: Subject to any disclaimer, the term of this patent is extended or adjusted under 35 U.S.C. 154(b) by 212 days.

(21) Appl. No.: 16/687,795

(22) Filed: Nov. 19, 2019

(65) Prior Publication Data

US 2020/0204997 A1 Jun. 25, 2020

(30) Foreign Application Priority Data

Dec. 20, 2018 (EP) ..................................... 18214411

(51) Int. Cl.
*H04W 12/06* (2021.01)
*H04W 4/80* (2018.01)
*H04L 67/02* (2022.01)

(52) U.S. Cl.
CPC ........... *H04W 12/068* (2021.01); *H04W 4/80* (2018.02); *H04L 67/02* (2013.01)

(58) Field of Classification Search
CPC ............. H04W 12/0608; H04W 12/06; H04W 12/068; H04W 4/80; H04L 9/32; H04L 63/08; H04L 67/02; G06F 21/30
See application file for complete search history.

(56) References Cited

U.S. PATENT DOCUMENTS 9,292,668 B1 * 3/2016 Spangler ................. G06F 21/31
2008/0173719 A1 7/2008 Wang
(Continued)

FOREIGN PATENT DOCUMENTS

KR         10-1147921 B1     5/2012
KR     10-2016-0128997 A    11/2016

OTHER PUBLICATIONS

European Search Report of European Application No. 18 21 4411 dated Apr. 10, 2019.
(Continued)

*Primary Examiner* — Muhammad Raza
(74) *Attorney, Agent, or Firm* — Sughrue Mion, PLLC

(57) ABSTRACT

A method of authenticating a transponder communicating with a server, including: calculating a one-time password in the transponder with a dedicated algorithm, on the basis of the state of a counter and a physical quantity, such as a transmission delay determined in the transponder during reading by a reading device; transmitting the password to the server by the reading device, which determines a transmission delay of the transponder, and transmitting to the server, in addition to the password, the information about the transmission delay determined in the reading device; decrypting by the dedicated algorithm the password, and checking if the decrypted transmission delay of the received password corresponds to the transmission delay determined by the reading device within a determined temporal margin, and if the state of the counter is different from a received previous state of the counter so as to authenticate the transponder.

20 Claims, 1 Drawing Sheet

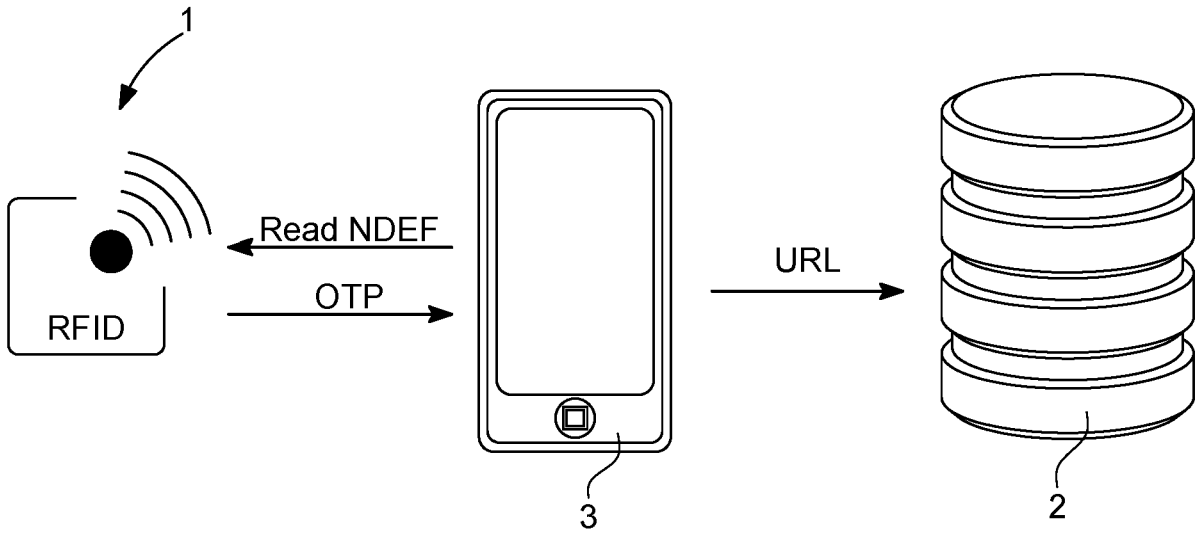

(56) References Cited

U.S. PATENT DOCUMENTS

| | | | |
|---|---|---|---|
| 2008/0235788 A1* | 9/2008 | El Saddik | G06F 21/36 |
| | | | 726/18 |
| 2009/0185687 A1 | 7/2009 | Wankmueller et al. | |
| 2009/0235339 A1 | 9/2009 | Mennes et al. | |
| 2015/0189505 A1 | 7/2015 | Marien | |
| 2016/0021103 A1* | 1/2016 | Koneru | H04L 63/0853 |
| | | | 726/6 |
| 2016/0275321 A1* | 9/2016 | Chau | H04B 5/0062 |
| 2017/0017947 A1* | 1/2017 | Robinton | H04W 12/069 |
| 2018/0052980 A1* | 2/2018 | Ahmed | H04W 4/80 |
| 2018/0145957 A1* | 5/2018 | Kasibhatla | H04L 63/1475 |
| 2019/0014107 A1* | 1/2019 | George | H04L 63/0838 |
| 2019/0356652 A1* | 11/2019 | Tyagi | H04L 63/0428 |
| 2020/0145408 A1* | 5/2020 | Komperla | H04L 9/3231 |
| 2021/0111875 A1* | 4/2021 | Le Saint | H04L 9/085 |

OTHER PUBLICATIONS

Communication dated Aug. 19, 2021 by the Korean Patent Office in Korean Application No. 10-2019-0168978.

* cited by examiner

Fig. 1

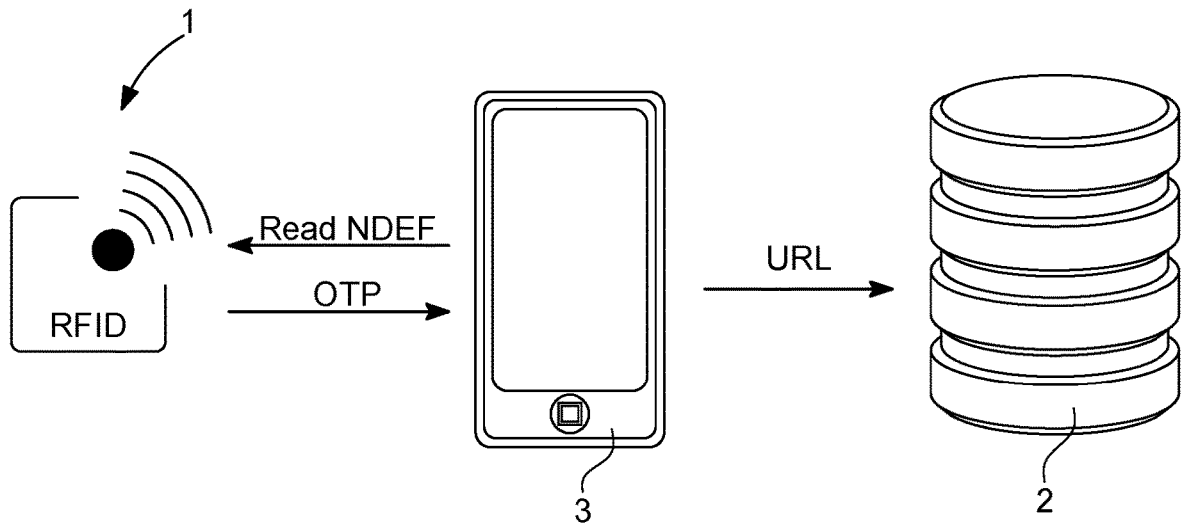

Fig. 2

| Server | Telephone | Transponder |
|---|---|---|
| | | CNT = 0 |

---

First use $AES^{-1}_K(CNT\|ID\|\Delta t\|fix) \leftarrow OTP + \Delta t' \leftarrow OTP = AES_K(CNT\|ID\|\Delta t\|fix)$
$\Delta t' \approx \Delta t$
$CNT > CNT_{enr}$

---

Second use $AES^{-1}_K(CNT\|ID\|\Delta t_2\|fix) \leftarrow OTP + \Delta t'_2 \leftarrow OTP = AES_K(CNT\|ID\|\Delta t_2\|fix)$
$\Delta t'_2 \approx \Delta t_2$
$CNT > CNT_{enr}$

---

$N^{th}$ use $AES^{-1}_K(CNT\|ID\|\Delta t_N\|fix) \leftarrow OTP + \Delta t'_N \leftarrow OTP = AES_K(CNT\|ID\|\Delta t_N\|fix)$
$\Delta t'_N \approx \Delta t_N$
$CNT > CNT_{enr}$

METHOD OF SECURELY AUTHENTICATING A TRANSPONDER IN COMMUNICATION WITH A SERVER

CROSS REFERENCE TO RELATED APPLICATIONS

This application claims priority to European Patent Application No. 18214411.3, filed on Dec. 20, 2018, the entire contents of which are incorporated herein by reference.

TECHNICAL FIELD

The present invention relates to a method of securely authenticating a transponder in communication with a server so as to check the authenticity of a product or of an object, or even so as to authorise access to a determined site.

The present invention relates also to a transponder which is able to implement the secure authentication method.

TECHNICAL BACKGROUND

With the deployment of the Internet of Things IoT, there are more and more objects or products which are equipped with transponders of any communication type. These transponders may be for example of the NFC near-field, or indeed also UHF, communication type. Such transponders are for example enclosed or encapsulated in sportswear, personal equipment or any other product or object. The user can type in or select the desired product to gain access to special offers, such as video on the Internet network (Web), discounts or other.

In order to determine the authenticity of a product, it is known to use for example a reading device, such as a portable telephone, which can be carried by a client, configured for such a check. The portable telephone can be configured so as to check, via a near-field communication, the authenticity of the product carrying the transponder. As a function of a signal in the traditional NDEF data exchange format, the portable telephone can be capable of determining if the product is authentic or if it concerns a fake product according to a list of known products for example and possibly stored in the portable telephone. However with solely this short-distance communication, no access to a dedicated server is effected, so as to allow authentication in a more certain manner of a product or an object, or even so as to authorise access to a determined site, which constitutes a disadvantage.

Generally for access for example to a site of a service or product provider, the transponder, which is placed on said product and which is personalised to said product, must be recognised by the server during a communication. A standard manner of recognising said transponder in communication is for example effected by means of a challenge-response protocol by using for example a technique of symmetric encryption and decryption (AES). A portable telephone is placed near the product carrying the personalised transponder, and an interrogation signal with a random number R is transmitted from the telephone to the transponder. The transponder generates an identification token "Token" according to an encryption algorithm by means of the received random number R and a secret key K so as to give the token Token=Algo(R, K). A transmission of the encrypted signal is effected to a dedicated server via the telephone so as to allow the server to calculate, on the basis of the random number R and the same secret key K, a check token TokenExp=Algo(R, K). A comparison between the transmitted token Token=Algo(R, K) from the transponder and the calculated one TokenExp=Algo(R, K) in the server is effected in order to know if the transponder is authentic or fake. If the transponder knows the secret key, this shows that it is authentic.

With the recognition technique of the transponder described above, this requires a particular application to be installed so as to transmit the challenge authentication command, which can complicate communication between the transponder and the server. Furthermore, nothing guarantees that any spy device for reading and intermediate transmission cannot be used in particular so as to store the encrypted signal during the transmission to the server, and so as to retransmit this encrypted signal during another transmission to the dedicated server so as to be recognised by the server. Hence, this constitutes a disadvantage.

In the chapter entitled "Implementation of a Countermeasure to Relay Attacks for Contactless HF Systems" INTECH of 2013, by Pierre-Henri Thevenon and Olivier Savry, detection of intermediate relays is described. A bidirectional communication protocol is used between a transponder payment card and a payment unit for example. This detection is effected by measuring the delay between receipt and transmission of signals which they generate using a correlation method. However, this does not protect against any storage of personal data during the transmission by a portable reading device in the vicinity for later use, which constitutes a disadvantage.

As described above, it is known to use cryptographic interrogation-response protocols for authenticating a transponder with its identifier. However this requires a bidirectional communication, which usually obliges an intermediate reading device to initiate the communication with a server. Currently, it is more practical to initiate the communication by supplying the transponder with a reading device, such as a mobile telephone in proximity for example. This implies that the link is an up-link only. This therefore signifies from the transponder to the server only.

The up-link protocols can be preferred because, on the one hand, a portable telephone does not need a particular application to be used since the innate NFC functions are employed, on the other hand, the communication between the transponder and the portable telephone is simplified.

Interrogation-response protocols are not appropriate in this situation. Instead of this, the use of a mechanisms based on the generation of a one-time password (OTP) is recommended. This allows authentication of the transponder with a one-pass protocol.

One advantage of an OTP protocol is that this protocol functions with all types of portable NFC telephones on the market. Certain telephones or usage systems do not support NFC commands other than the traditional NDEF data exchange format. It is therefore impossible to send a challenge to the transponder.

In the OTP one-time password communication protocol, the transponder and the server can share one and the same secret key K. The OTP one-time password comprises the state of an internal counter CNT concatenated with the result of an encryption algorithm Algo(K, CNT| |ID| |fix), where K is the secret key, ID is the identification number of the transponder and fix is a constant. The algorithm can be a symmetric encryption algorithm (AES). This transmitted OTP word is a generated word which can be used only once for cryptography.

Normally, the transmission to the server passes through an interrogation or reading device, which can be mobile like a portable telephone. This portable telephone is placed in the vicinity of the transponder for a connection, for example NFC, in order to serve as intermediary (gateway) with the remote server.

The server receives from the portable telephone in communication with the transponder, the word OTP. The server will determine another password OTP_Exp with the same secret key K on the basis of the state of a counter CNT received from the transponder, concatenated with the result of the encryption algorithm Algo(K, CNT| |ID| |fix). Of course, the server checks first of all that the state of the counter CNT is greater than a preceding state of the counter $CNT_{-1}$ which has been received and stored. The counter of the transponder is generally incremented by one unit at each reading. Thus, if the word OTP_Exp is equal to the word OTP coming from the transponder, then the transponder is considered as authenticated.

A threat to this one-pass protocol can occur. It can be envisaged that, in a first phase, the one-pass word OTP, generated by the transponder in read and valid, may be read by any transponder reader in the vicinity. In these conditions, the word OTP is not sent to the dedicated server but is recorded in a file of the reader. Several successive words OTP can thus be recorded in the pirate reader. In a second phase, the various one-time passwords OTP can be stored in a pirate transponder, and a transmission of each successive word OTP can be effected by means of a valid reader in order to arrive at the dedicated server. The server will note that the state of the counter CNT stored in each word OTP fulfils the criterion of being greater than the preceding state of the counter received by the server. In these conditions, the server will calculate the other password OTP_Exp and can note that it corresponds to the genuine word OTP. Thus it is possible via this pirate technique to have a false transponder pass for a valid transponder, which constitutes a disadvantage.

SUMMARY OF THE INVENTION

The aim of the invention is therefore to alleviate the disadvantages of the above-mentioned prior art by providing a method of securely authenticating a transponder in communication with a server so as to check the authenticity of a product or of an object, or even to authorise access to a determined site. This makes it possible to avoid any replay attack or attack by fake readers while guaranteeing protection of the consumer by checking said product by means of the transponder which he is carrying.

To this effect, the invention relates to a method of securely authenticating a transponder in communication with a server so as to check the authenticity of a product or of an object, or so as to authorise access to a determined site, which comprises the characteristics defined in the independent claim 1.

Particular steps of the method of securely authenticating a transponder are defined in the dependent claims 2 to 12.

An advantage of the method of securely authenticating a transponder resides in the fact that a one-time password (OTP) is generated at each reading of the transponder by a reading device. This one-time password is encrypted by a dedicated algorithm with a secret key on the basis of a state of a counter of the transponder at the moment of reading and a transmission delay determined in the transponder for example randomly at each reading. The one-time password OTP is transmitted at each reading to a dedicated server by means of a reading device which has the responsibility of determining the transmission delay upon receipt of the one-time password OTP from the transponder. The reading device transmits, in addition to the one-time password OTP, the transmission delay determined in the reading device to the server. Finally the server can decrypt the received one-time password with one and the same algorithm with the secret key so as to compare the decrypted transmission delay of the one-time password and the transmission delay determined in the reading device in order to authenticate the transponder if the transmission delays correspond within a determined temporal margin. Furthermore, in order to authenticate said transponder, the server checks that the state of the decrypted counter is different from a stored previous state of the counter and preferably greater than the stored previous state of the counter.

Advantageously, the initial value of the counter before the first use or reading can be determined randomly non-zero and larger than 0.

By virtue of the method of authenticating the transponder, prevention of any use of malicious readers or copies of one-time passwords in a fake transponder is achieved.

To this effect, the invention relates also to a transponder which is suitable for implementing the secure authentication method and comprises the characteristics defined in the independent claim 13.

BRIEF DESCRIPTION OF THE FIGURES

The aims, advantages and characteristics of the method of authenticating a transponder in communication with a server will become better apparent in the following description on the basis of at least one nonlimiting embodiment illustrated by the drawings in which:

FIG. 1 schematically represents the components for a communication between a transponder mounted on a product or an object and a dedicated server to authenticate it according to the invention, and FIG. 2 represents the steps of a method of authenticating a transponder in communication with a server according to the invention.

DETAILED DESCRIPTION OF THE INVENTION

In the following description, all the components used for the method of securely authenticating a transponder in communication with a server according to the invention, which are well known to the person skilled in the art in this technical field, will be recited in a simplified manner only.

FIG. 1 represents schematically the various elements of a system for authenticating a transponder 1 for a communication with a server 2. The system comprises at least one transponder 1 disposed on an object or a product, such as an item of sportswear or a shoe or any other product or object of daily life. Generally, the transponder 1, which comprises for example wireless linking means for establishing a communication with the server 2, can be awoken or activated by a reading device 3. A near-field communication NFC or a UHF communication by means in particular of the reading device 3 can be established.

It should be noted that it must be understood that receipt of an interrogation signal from the transponder 1 also relates to the request to the transponder 1 by the reading device 3 or activation of the transponder 1 by the reading device 3.

The reading device 3 can be a mobile communication unit, such as a portable telephone or portable tablet 3. This portable telephone or tablet 3 can establish a communication with a server 2 in order to start the method of authenticating a transponder 1 so as to allow it, once authenticated, to gain access for example to a determined site by means of the server 2. The determined site relates to the product on which the transponder 1 is disposed.

With respect likewise to FIG. 2 related to FIG. 1, on the approach of the mobile communication unit 3, such as a portable telephone 3, to the transponder 1, the latter can be powered by rectifying an interrogation signal sensed from the telephone. Once awoken upon receipt of the interrogation signal NDEF, the transponder 1 can perform the operations of calculating or encrypting a one-time password OTP in a processing unit of the transponder 1 with the help of a dedicated algorithm and of a secret key K. The algorithm is stored in a memory unit connected to the processing unit, and can be a symmetric encryption and decryption algorithm (AES). The one-time password OTP is calculated on the basis of the current state CNT of a counter connected to the processing unit of the transponder 1, and on the basis of a physical quantity which is preferably a determined transmission delay $\Delta t$ in the transponder 1 immediately upon receipt of the interrogation signal received from the reading device 3. However, the physical quantity can be different from a transmission delay, i.e. a physical quantity which can be measured just as well by the transponder as by the reading device, for example a temperature measurement or a pressure measurement, such as atmospheric pressure.

The password OTP is equal to $AES_K(CNT| |ID| |\Delta t| |fix)$, where K is the secret key, CNT is the current state of the counter of the transponder 1 at the reading request, ID is an identification number of the transponder 1 or of the product on which it is placed, $\Delta t$ is a transmission delay determined for example randomly in the transponder 1, and fix is a constant, or even a variable. Of course at least the state of the counter CNT and the transmission delay $\Delta t$ must be encrypted in the one-time password OTP for a transmission to the mobile communication unit 3, such as the portable telephone, and for the server 2.

The one-time password OTP is transmitted by the wireless linking means of the transponder 1 to the server 2 by means of the reading device 3. The reading device 3 determines the transmission delay $\Delta t'$ of the transponder 1 upon receipt of the one-time password OTP from the transponder 1. The reading device 3 can determine directly this transmission delay $\Delta t'$, on the basis of the interrogation signal NDEF transmitted from the reading device 3 to the transponder 1. The reading device 3 transmits to the server 2 in a URL signal, in addition to the one-time password OTP, information about the transmission delay $\Delta t'$, determined in the reading device 3.

As soon as the one-time password OTP is received in the server 2 with information of the transmission delay $\Delta t'$, a decryption operation $AES^{-1}_K(CNT| |ID| |\Delta t| |fix)$ is effected in the server 2 by means of one and the same secret key K and by the dedicated algorithm, which is preferably the symmetric encryption and decryption algorithm (AES). In the server 2, there is effected a check of the decrypted transmission delay $\Delta t$ of the received one-time password OTP, and of the transmission delay $\Delta t'$, determined in the reading device 3. If the two transmission delays $\Delta t'$, $\Delta t$ correspond within a determined temporal margin, it is the case that the one-time password OTP indeed comes from the transponder 1 to be authenticated. Furthermore, a check of the state of the decrypted counter CNT is effected in order to know if it is different from a previous state of the counter $CNT_{enr}$ stored in the server 2. Preferably, the state of the decrypted counter CNT of the received one-time password OTP should be greater than the previous state of the stored counter $CNT_{enr}$. If at least these two criteria are verified, the transponder 1 is authenticated by the server 2 so as to allow it for example to authorise it to have access to a determined site of products in relation to the product on which the transponder 1 is placed. Normally, the identification number ID of the transponder and the constant or variable fix which are deciphered are also verified.

It should be noted that the transmission delay $\Delta t$ determined at each reading in the transponder 1 must be much greater than the receiving and transmitting times of the signals between the transponder 1, the reading device 3 and the server 2. As the communication with the server 2 does not enter into the calculation of the delay $\Delta t$ or $\Delta t'$, the transmitting and receiving times with the server 2 are of less importance. A time base connected to the treatment unit of the transponder 1 can be calibrated initially before a first use or first reading. It can be envisaged that the transmission delay $\Delta t$ is at least 3 times greater than the difference between the maximum and minimum transmitting and receiving times measured by the reading device 3.

Upon receiving and checking in the server 2 of the URL signal, a determined temporal margin of correspondence between the two transmission delays which are compared so as to authenticate the transponder 1 is accepted. There are taken into account in particular gaps in the time bases between each communication unit and receiving and transmitting times. An error which can reach 10% between the two transmission delays can be accepted. However this error is variable as a function of the measuring system which is used.

It should also be noted that the state of the counter CNT can vary from a first reading to a second reading with an increment of one unit at each reading or with an increment of a random number, which is a whole number greater than or equal to 1, determined at each reading. Initially the counter CNT of the transponder can be set at zero so as to allow a certain number of successive readings without requiring to wait for a limit value of the counting and to return to zero.

It should further be noted that instead of a mobile communication unit, such as a telephone or a tablet 3, it is possible to envisage the use of a remote communication unit for a communication by UHF signals with the transponder 1. This UHF communication unit can be an entrance gate to a ski installation, a motorway toll station or diverse other objects, linked to a server 2 in a wired or preferably wireless manner.

Instead of symmetric encryption or decryption, it is possible to envisage also using encryption and decryption of each one-time password OTP by means of an asymmetric encryption and decryption algorithm.

From the description which has just been given, several variants of the method of securely authenticating a transponder in communication with a server according to the invention can be conceived by the person skilled in the art without departing from the scope of the invention defined by the claims. The transponder can be of the passive type, or indeed of the active type with its own energy source, which can be a battery, or a solar cell or a thermoelectric generator.

The invention claimed is:

1. A method of securely authenticating a transponder (1) in communication with a server (2), the transponder comprising a processing unit connected to a memory unit, to a counter and to connection means so as to establish a communication with the server (2), characterised in that the method comprises steps of:
   calculating a one-time password (OTP) in the processing unit of the transponder (1) with help of a dedicated algorithm, said algorithm configured to implement at least part of a symmetric encryption and decryption algorithm described by Advanced Encryption Standard (AES) and being stored, on a basis of a current state of the counter and on a basis of a physical quantity determined in the transponder (1) following receipt of an interrogation signal received from a reading device (3), transmitting the one-time password (OTP) to the server (2) by means of the reading device (3), which determines the physical quantity of the transponder (1), and transmitting to the server (2), in addition to the one-time password (OTP), an information about the physical quantity determined in the reading device (3), receiving the one-time password (OTP) in the server (2) with the information about the physical quantity of the reading device (3), decrypting by the dedicated algorithm the one-time password (OTP), and checking if the decrypted physical quantity, which comprises a transmission delay value and a temperature value, of the received one-time password (OTP) matches the physical quantity, which comprises a corresponding another transmission delay value and another temperature value, determined in the reading device (3) and received in the information about the physical quantity, and if the state of the counter is different from a received previous state of the counter so as to authenticate the transponder, wherein the state of the counter and the received previous state of the counter each indicate either a same value or different values of a number of uses of the transponder, wherein the method is further characterised in that:

the physical quantity determined in the transponder (1) is a determined transmission delay ($\Delta t$) as the transmission delay value, in that the reading device (3) determines the transmission delay ($\Delta t'$) of the transponder upon receipt of data from the transponder (1), and so as to transmit to the server (2), in addition to the one-time password (OTP), the information about the transmission delay ($\Delta t'$) determined in the reading device (3), and in that, after decrypting of the one-time password (OTP), it is checked in the server (2) if the decrypted transmission delay ($\Delta t$) of the received one-time password (OTP) corresponds to the transmission delay ($\Delta t'$) determined in the reading device (3) and received in the information about the transmission delay ($\Delta t'$) within a determined temporal margin, so as to authenticate the transponder (1), the physical quantity determined in the transponder (1) is also the temperature measurement as a temperature measurement value, in that the reading device (3) determines a temperature in the course of the authentication method, and so as to transmit to the server (2), in addition to the one-time password (OTP), the information about the temperature measurement determined in the reading device (3), and in that, after decrypting the one-time password (OTP), it is checked in the server (2) if the decrypted temperature measurement of the received one-time password (OTP) corresponds to the temperature measurement determined in the reading device (3) and received in the information about the temperature measurement, so as to authenticate the transponder (1), and the physical quantity determined in the transponder (1) is also the determined transmission delay ($\Delta t$) as the transmission delay value and at each reading of the transponder (1), a new transmission delay ($\Delta t$) is determined randomly in the transponder (1).

2. The method of securely authenticating a transponder (1) according to claim 1, characterised in that the communication between the transponder (1) and the server (2) passes by means of the reading device (3), which is a mobile communication unit (3), in near-field connection with the transponder (1).

3. The method of securely authenticating a transponder (1) according to claim 1, characterised in that the communication between the transponder (1) and the server (2) passes by means of the reading device (3), which is a mobile communication unit (3), in UHF connection with the transponder (1).

4. The method of securely authenticating a transponder (1) according to claim 1, characterised in that the physical quantity determined in the transponder (1) is also a pressure measurement as a pressure measurement value, in that the reading device (3) determines a pressure, such as an atmospheric pressure, in the course of the authentication method, and so as to transmit to the server (2), in addition to the one-time password (OTP), the information about the pressure measurement determined in the reading device (3), and in that, after decrypting the one-time password (OTP), it is checked in the server (2) if a decrypted pressure measurement of the received one-time password (OTP) corresponds to the pressure measurement determined in the reading device (3) and received in the information about the pressure measurement, so as to authenticate the transponder (1).

5. The method of securely authenticating a transponder (1) according to claim 1, characterised in that the encryption and decryption of each one-time password (OTP) is obtained by means of the AES and by means of one and the same secret key (K) stored in the transponder (1) and the server (2).

6. The method of securely authenticating a transponder (1) according to claim 1, characterised in that the encryption and decryption of each one-time password (OTP) is obtained by means of an asymmetric encryption and decryption algorithm.

7. The method of securely authenticating a transponder (1) according to claim 1, characterised in that each transmission delay ($\Delta t$) can be at least 3 times greater than the difference between the maximum and minimum times measured by the reading device (3).

8. The method of securely authenticating a transponder (1) according to claim 1, characterised in that, at each reading of the transponder (1), a new quantity is determined in the transponder (1).

9. The method of securely authenticating a transponder (1) according to claim 1, characterised in that, at each new reading of the transponder (1), the state of the counter is incremented or decremented by a random number, which is a whole number greater than or equal to 1, and in that the server (2) determines if the state of the decrypted counter of the received one-time password (OTP) is greater than or less than a previous state of the counter stored in the server so as to authenticate the transponder (1).

10. A transponder (1) comprising:
a memory;
a counter;
a connection means; and
a processor which is able to implement a one-time password (OTP) authentication protocol, wherein the processor connected to the memory comprising a dedicated encryption algorithm, the counter and the connection means so as to establish a communication with a server (2), wherein in that the transponder (1) is adapted so as to determine or measure a physical quantity, which is encrypted in the one-time password (OTP) for a transmission to the server (2) by means of a reading device (3), which is capable of determining the physical quantity, wherein the OTP authentication protocol comprises:

calculating a one-time password (OTP) in the processor of the transponder (1) with help of a dedicated algorithm, said algorithm configured to implement at least part of a symmetric encryption and decryption algorithm described by Advanced Encryption Standard (AES) and being stored, on a basis of a current state of the counter and on a basis of a physical quantity determined in the transponder (1) following receipt of an interrogation signal received from a reading device (3), transmitting the one-time password (OTP) to the server (2) by means of the reading device (3), which determines the physical quantity of the transponder (1), and transmitting to the server (2), in addition to the one-time password (OTP), an information about the physical quantity determined in the reading device (3), receiving the one-time password (OTP) in the server (2) with the information about the physical quantity of the reading device (3), decrypting by the dedicated algorithm the one-time password (OTP), and checking if a decrypted physical quantity, which comprises a transmission delay value and a temperature value, of the received one-time password (OTP) matches the physical quantity, which comprises a corresponding one of another transmission delay value; and another temperature value, and another atmospheric pressure value, determined in the reading device (3) and received in the information about the physical quantity, and if the state of the counter is different from a received previous state of the counter so as to authenticate the transponder, and wherein the state of the counter and the received previous state of the counter each indicate either a same value or different values of a number of uses of the transponder, and wherein the OTP authentication protocol is further characterised in that:

the physical quantity determined in the transponder (1) is a determined transmission delay ($\Delta t$) as the transmission delay value, in that the reading device (3) determines the transmission delay ($\Delta t'$) of the transponder upon receipt of data from the transponder (1), and so as to transmit to the server (2), in addition to the one-time password (OTP), the information about the transmission delay ($\Delta t'$) determined in the reading device (3), and in that, after decrypting of the one-time password (OTP), it is checked in the server (2) if the decrypted transmission delay ($\Delta t$) of the received one-time password (OTP) corresponds to the transmission delay ($\Delta t'$) determined in the reading device (3) and received in the information about the transmission delay ($\Delta t'$) within a determined temporal margin, so as to authenticate the transponder (1), the physical quantity determined in the transponder (1) is also the temperature measurement as a temperature measurement value, in that the reading device (3) determines a temperature in the course of the authentication method, and so as to transmit to the server (2), in addition to the one-time password (OTP), the information about the temperature measurement determined in the reading device (3), and in that, after decrypting the one-time password (OTP), it is checked in the server (2) if the decrypted temperature measurement of the received one-time password (OTP) corresponds to the temperature measurement determined in the reading device (3) and received in the information about the temperature measurement, so as to authenticate the transponder (1), and the physical quantity determined in the transponder (1) is also the determined transmission delay ($\Delta t$) as the transmission delay value and at each reading of the transponder (1), a new transmission delay ($\Delta t$) is determined randomly in the transponder (1).

11. A method of securely authenticating a transponder (1) in communication with a server (2), the transponder comprising a processing unit connected to a memory unit, to a counter and to connection means so as to establish a communication with the server (2), characterised in that the method comprises steps of:

calculating a one-time password (OTP) in the processing unit of the transponder (1) with help of a dedicated algorithm, said algorithm configured to implement at least part of a symmetric encryption and decryption algorithm described by Advanced Encryption Standard (AES) and being stored, on a basis of a current state of the counter and on a basis of a physical quantity determined in the transponder (1) following receipt of an interrogation signal received from a reading device (3), transmitting the one-time password (OTP) to the server (2) by means of the reading device (3), which determines the physical quantity of the transponder (1), and transmitting to the server (2), in addition to the one-time password (OTP), an information about the physical quantity determined in the reading device (3), receiving the one-time password (OTP) in the server (2) with the information about the physical quantity of the reading device (3), decrypting by the dedicated algorithm the one-time password (OTP), and checking if the decrypted physical quantity, which comprises a transmission delay value and an atmospheric pressure value, of the received one-time password (OTP) matches the physical quantity, which comprises a corresponding another transmission delay value and another atmospheric pressure value, determined in the reading device (3) and received in the information about the physical quantity, and if the state of the counter is different from a received previous state of the counter so as to authenticate the transponder, wherein the state of the counter and the received previous state of the counter each indicate either a same value or different values of a number of uses of the transponder, wherein the method is further characterised in that:

the physical quantity determined in the transponder (1) is a determined transmission delay ($\Delta t$) as the transmission delay value, in that the reading device (3) determines the transmission delay ($\Delta t'$) of the transponder upon receipt of data from the transponder (1), and so as to transmit to the server (2), in addition to the one-time password (OTP), the information about the transmission delay (Δt') determined in the reading device (3), and in that, after decrypting of the one-time password (OTP), it is checked in the server (2) if the decrypted transmission delay (Δt) of the received one-time password (OTP) corresponds to the transmission delay (Δt') determined in the reading device (3) and received in the information about the transmission delay (Δt') within a determined temporal margin, so as to authenticate the transponder (1), the physical quantity determined in the transponder (1) is also a pressure measurement as the atmospheric pressure value, in that the reading device (3) determines a pressure, such as an atmospheric pressure, in the course of the authentication method, and so as to transmit to the server (2), in addition to the one-time password (OTP), the information about the pressure measurement determined in the reading device (3), and in that, after decrypting the one-time password (OTP), it is checked in the server (2) if the decrypted pressure measurement of the received one-time password (OTP) corresponds to the pressure measurement determined in the reading device (3) and received in the information about the pressure measurement, so as to authenticate the transponder (1), and the physical quantity determined in the transponder (1) is also the determined transmission delay (Δt) as the transmission delay value and at each reading of the transponder (1), a new transmission delay (Δt) is determined randomly in the transponder (1).

12. The method of securely authenticating a transponder (1) according to claim 11, characterised in that the communication between the transponder (1) and the server (2) passes by means of the reading device (3), which is a mobile communication unit (3), in near-field connection with the transponder (1).

13. The method of securely authenticating a transponder (1) according to claim 11, characterised in that the communication between the transponder (1) and the server (2) passes by means of the reading device (3), which is a mobile communication unit (3), in UHF connection with the transponder (1).

14. The method of securely authenticating a transponder (1) according to claim 11, characterised in that the physical quantity determined in the transponder (1) is also a temperature measurement as a temperature measurement value, in that the reading device (3) determines a temperature in the course of the authentication method, and so as to transmit to the server (2), in addition to the one-time password (OTP), the information about the temperature measurement determined in the reading device (3), and in that, after decrypting the one-time password (OTP), it is checked in the server (2) if a decrypted temperature measurement of the received one-time password (OTP) corresponds to the temperature measurement determined in the reading device (3) and received in the information about the temperature measurement, so as to authenticate the transponder (1).

15. The method of securely authenticating a transponder (1) according to claim 11, characterised in that the encryption and decryption of each one-time password (OTP) is obtained by means of the AES and by means of one and the same secret key (K) stored in the transponder (1) and the server (2).

16. The method of securely authenticating a transponder (1) according to claim 11, characterised in that the encryption and decryption of each one-time password (OTP) is obtained by means of an asymmetric encryption and decryption algorithm.

17. The method of securely authenticating a transponder (1) according to claim 11, characterised in that each transmission delay (Δt) can be at least 3 times greater than the difference between the maximum and minimum times measured by the reading device (3).

18. The method of securely authenticating a transponder (1) according to claim 11, characterised in that, at each reading of the transponder (1), a new quantity is determined in the transponder (1).

19. The method of securely authenticating a transponder (1) according to claim 11, characterised in that, at each new reading of the transponder (1), the state of the counter is incremented or decremented by a random number, which is a whole number greater than or equal to 1, and in that the server (2) determines if the state of the decrypted counter of the received one-time password (OTP) is greater than or less than a previous state of the counter stored in the server so as to authenticate the transponder (1).

20. A transponder (1) comprising:
a memory;
a counter;
a connection means; and
a processor which is able to implement a one-time password (OTP) authentication protocol,
wherein the processor is connected to the memory comprising a dedicated encryption algorithm, the counter and the connection means so as to establish a communication with a server (2),
wherein in that the transponder (1) is adapted so as to determine or measure a physical quantity, which is encrypted in the one-time password (OTP) for a transmission to the server (2) by means of a reading device (3), which is capable of determining the physical quantity,
wherein the OTP authentication protocol comprises:
calculating a one-time password (OTP) in the processor of the transponder (1) with help of a dedicated algorithm, said algorithm configured to implement at least part of a symmetric encryption and decryption algorithm described by Advanced Encryption Standard (AES) and being stored, on a basis of the current state of the counter and on a basis of a physical quantity determined in the transponder (1) following receipt of an interrogation signal received from a reading device (3),
transmitting the one-time password (OTP) to the server (2) by means of the reading device (3), which determines the physical quantity of the transponder (1), and transmitting to the server (2), in addition to the one-time password (OTP), an information about the physical quantity determined in the reading device (3),
receiving the one-time password (OTP) in the server (2) with the information about the physical quantity of the reading device (3),
decrypting by the dedicated algorithm the one-time password (OTP), and
checking if the decrypted physical quantity, which comprises a transmission delay value and an atmospheric pressure value, of the received one-time password (OTP) matches the physical quantity, which comprises a corresponding another transmission delay value and another atmospheric pressure value, determined in the reading device (3) and received in the information about the physical quantity, and if the state of the counter is different from a received previous state of the counter so as to authenticate the transponder, and wherein the state of the counter and the received previous state of the counter each indicate either a same value or different values of a number of uses of the transponder, wherein the OTP authentication protocol is further characterised in that:

the physical quantity determined in the transponder (1) is a determined transmission delay ($\Delta t$) as the transmission delay value, in that the reading device (3) determines the transmission delay ($\Delta t'$) of the transponder upon receipt of data from the transponder (1), and so as to transmit to the server (2), in addition to the one-time password (OTP), the information about the transmission delay ($\Delta t'$) determined in the reading device (3), and in that, after decrypting of the one-time password (OTP), it is checked in the server (2) if the decrypted transmission delay ($\Delta t$) of the received one-time password (OTP) corresponds to the transmission delay ($\Delta t'$) determined in the reading device (3) and received in the information about the transmission delay ($\Delta t'$) within a determined temporal margin, so as to authenticate the transponder (1), the physical quantity determined in the transponder (1) is also a pressure measurement as the atmospheric pressure value, in that the reading device (3) determines a pressure, such as an atmospheric pressure, in the course of the authentication method, and so as to transmit to the server (2), in addition to the one-time password (OTP), the information about the pressure measurement determined in the reading device (3), and in that, after decrypting the one-time password (OTP), it is checked in the server (2) if the decrypted pressure measurement of the received one-time password (OTP) corresponds to the pressure measurement determined in the reading device (3) and received in the information about the pressure measurement, so as to authenticate the transponder (1), and the physical quantity determined in the transponder (1) is also the determined transmission delay ($\Delta t$) as the transmission delay value and at each reading of the transponder (1), a new transmission delay ($\Delta t$) is determined randomly in the transponder (1).

\* \* \* \* \*

UNITED STATES PATENT AND TRADEMARK OFFICE
CERTIFICATE OF CORRECTION

PATENT NO. : 11,356,849 B2
APPLICATION NO. : 16/687795
DATED : June 7, 2022
INVENTOR(S) : Stephanie Salgado and Julian Guilloux Page 1 of 1

It is certified that error appears in the above-identified patent and that said Letters Patent is hereby corrected as shown below:

In the Claims

Column 9, Line 1; In Claim 10, after "processor", insert --is--

Column 9, Line 38; In Claim 10, after "corresponding", delete "one of"

Column 9, Line 39; In Claim 10, delete "value;" and insert --value-- therefor

Column 9, Lines 39-40; In Claim 10, delete "value, and another atmospheric pressure value," and insert --value,-- therefor Signed and Sealed this
Sixth Day of September, 2022

Katherine Kelly Vidal
*Director of the United States Patent and Trademark Office*